United States Patent
Gonguet et al.

(10) Patent No.: US 11,978,164 B2
(45) Date of Patent: May 7, 2024

(54) METHOD FOR DETERMINING DISPLAY FEATURES OF AN AUGMENTED REALITY ELEMENT

(71) Applicant: TotalEnergies SE, Courbevoie (FR)

(72) Inventors: Arnaud Gonguet, Courbevoie (FR); Grégory Tetard, Courbevoie (FR)

(73) Assignee: TotalEnergies SE, Courbevoie (FR)

( * ) Notice: Subject to any disclaimer, the term of this patent is extended or adjusted under 35 U.S.C. 154(b) by 0 days.

(21) Appl. No.: 17/677,228

(22) Filed: Feb. 22, 2022

(65) Prior Publication Data

US 2022/0270334 A1 Aug. 25, 2022

(51) Int. Cl.
| | |
|---|---|
| *G06T 19/00* | (2011.01) |
| *G06F 3/01* | (2006.01) |
| *G06T 7/70* | (2017.01) |
| *G06V 10/70* | (2022.01) |

(52) U.S. Cl.
CPC ............ *G06T 19/006* (2013.01); *G06F 3/013* (2013.01); *G06T 7/70* (2017.01); *G06V 10/70* (2022.01)

(58) Field of Classification Search
CPC .................................................. G06T 19/006
See application file for complete search history.

(56) References Cited

U.S. PATENT DOCUMENTS

| | | | |
|---|---|---|---|
| 9,741,169 B1 | 8/2017 | Holz | |
| 2014/0111639 A1* | 4/2014 | Tanaka | G06V 10/245 348/135 |
| 2020/0321099 A1* | 10/2020 | Holladay | G06T 7/0012 |

OTHER PUBLICATIONS

Rapport De Recherche Préliminaire issued in French Patent Application No. 2101690 dated Nov. 3, 2021.
Uematsu, Y, et al. "Improvement of Accuracy for 2D Marked-Based Tracking Using Particle Filter" IEEE 17th International Conference on Artificial Reality and Telexistence, pp. 183-189 (2007).
Wagner, D., et al. "Robust and Unobstrusive Marked Tracking on Mobile Phones" IEEE International Symposium on Mixed and Augmented Reality, pp. 121-124 (2008).
Park, N., et al. "Barcode-Assisted Planar Object Tracking Method for Mobile Augmented Reality" IEEE International Symposium on Ubiquitous Virtual Reality, pp. 40-43 (2011).

* cited by examiner

*Primary Examiner* — Shivang I Patel
(74) *Attorney, Agent, or Firm* — TROUTMAN PEPPER HAMILTON SANDERS LLP (57) ABSTRACT

The present invention relates to a method for determining display features of an augmented reality element, the method comprising the steps of receiving an image depicting a visual marker on a support surface, obtaining correspondence data between the augmented reality element and the visual marker, calculating the distance and a viewing angle relative to the visual marker and the user, correcting the viewing angle calculated as a function of features relating to a support plane containing the support surface, to obtain a corrected viewing angle, and determining display features of the augmented reality element based on the correspondence data, a rotation of the visual marker relative to a reference, the calculated distance and the corrected viewing angle.

9 Claims, 6 Drawing Sheets

METHOD FOR DETERMINING DISPLAY FEATURES OF AN AUGMENTED REALITY ELEMENT

CROSS REFERENCE TO RELATED APPLICATION

The present application claims priority of French Patent Application No. 21 01690 filed Feb. 22, 2021. The entire contents of which are hereby incorporated by reference.

TECHNICAL FIELD

The present invention relates to a method for determining display features of an augmented reality element. The present invention also relates to an associated augmented reality headset.

BACKGROUND

Augmented reality is a technology that superimposes virtual information, i.e. computer-generated images, in the user's field of vision. One of the challenges of augmented reality is to project virtual information in the right place on a screen so that this information is integrated into real space in a realistic way.

In industry, augmented reality is used in particular to superimpose virtual information in the vicinity of a reference when the user is in the vicinity of said reference. For example, one technique is to scan a visual marker as a reference and display virtual information in relation to that visual marker.

However, current techniques based on scanning a visual marker are not satisfactory when the visual marker is at a great distance from the operator and/or the virtual information to be displayed is far from the visual marker. For example, when the virtual information is a few metres from the visual marker, an error in the orientation of the visual marker of a few degrees results in an error of several tens of centimetres in the position of the virtual information.

There is therefore a need for a method to enhance an operator's augmented reality experience regardless of the operator's position relative to an element serving as a reference for the display of virtual information, even if the virtual information is to be displayed at a distance from the reference.

SUMMARY

To this end, the present description relates to a method for determining display features of an augmented reality element, the method being implemented by a computer and comprising the steps of:
 a. receiving an image of an environment, the image comprising (i.e. depicting) a visual marker and a surface, referred to as a support surface, serving as a support for the visual marker, the visual marker) comprising a rotation indicator, the image having been acquired by a camera of an augmented reality headset worn by a user,
 b. obtaining data, known as correspondence data, relating to the position and orientation of an augmented reality element to be displayed with respect to the visual marker,
 c. calculating the distance between the visual marker and the user by analysing the received image,
 d. calculating a viewing angle from which the user sees the visual marker by analysing the received image,
 e. determining, as a function of the viewing angle ($\alpha$), features relating to a plane containing the support surface, the plane being called the support plane,
 f. correcting the viewing angle calculated according to the determined features of the support plane to obtain a corrected viewing angle,
 g. calculating the rotation of the visual marker with respect to a reference according to the rotation indicator of the visual marker, the rotation of the visual marker being calculated according to a direction corresponding to the direction of the user's gaze, called the transverse direction, and
 h. determining display features of the augmented reality element based on the correspondence data, the calculated rotation, the calculated distance and the corrected viewing angle.

In other beneficial aspects, the method comprises one or more of the following features, taken in isolation or in any technically possible combination:
 the visual marker has reference points, the step of calculating the viewing angle comprising detecting the reference points of the visual marker on the image, and determining the deformation of the visual marker on the image relative to a reference shape of the visual marker as a function of the detected reference points, the viewing angle being calculated as a function of the determined deformation;
 the step of determining features of the support plane comprises the substeps of:
  a. determining features relating to a plane, called the marker plane, containing the visual marker as a function of the calculated viewing angle,
  b. determining, by a detection model, features of a plane representing the support plane, known as the test plane,
  c. determining a deviation between the marker plane and the test plane, and
  d. validating the test plane as the support plan only when the determined deviation is less than or equal to a predetermined threshold, and repeating the substeps of determining a test plane and determining a deviation until a validated test plane is obtained;
 the detection model is a model for meshing the surfaces of the environment in the field of view of the camera that acquired the received image;
 the step of determining features of the support plane comprises determining the incline of the support plane with respect to a reference, and correcting the calculated viewing angle according to the determined incline;
 the visual marker has reference points, the step of calculating the distance comprising detecting the reference points of the visual marker on the image, and determining the distance based on the detected reference points and reference dimensions of the visual marker;
 the method comprises sending, to a display of the augmented reality headset worn by the user, a command to display the augmented reality element associated with the visual marker according to the determined display features;
 the visual marker is a two-dimensional code.

The present description also relates to a computer program product comprising program instructions recorded on a computer-readable medium, for executing a determination method as described above when the computer program is run on a computer.

The present description also relates to a readable information medium on which a computer program product as previously described is stored.

The present description also relates to an augmented reality headset comprising a display, a camera capable of acquiring images of an environment in the field of view of a user of the headset and a computer, the computer being configured to implement a determination method as described above.

BRIEF DESCRIPTION OF THE DRAWINGS

Other characteristics and advantages of the invention will become apparent upon reading the following description of embodiments of the invention, given only as an example and referencing the drawings, in which.

DETAILED DESCRIPTION

Figure 1:
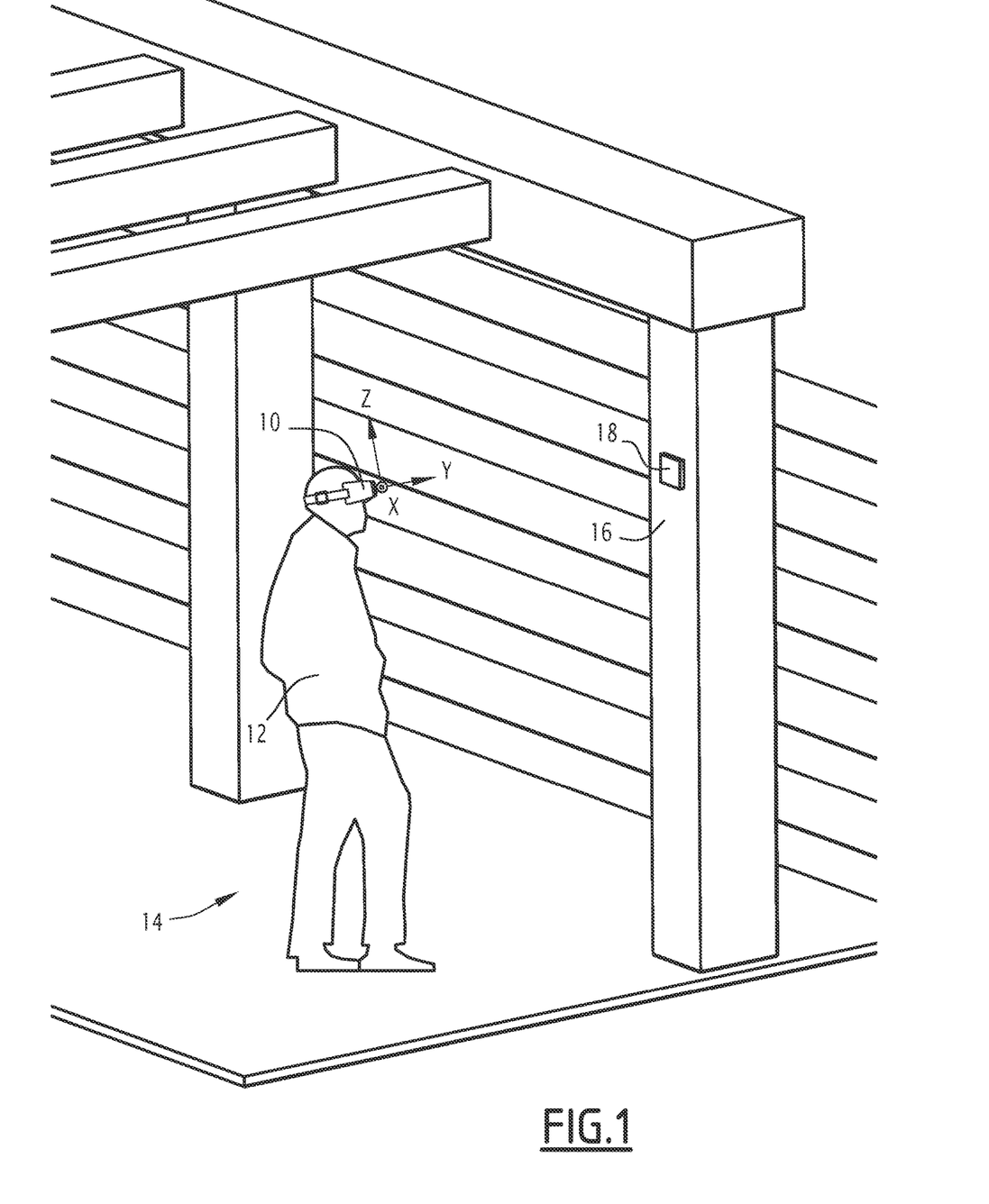
FIG. 1 is a schematic view of an example of an environment in which a user equipped with an augmented reality headset is located, the environment comprises a surface supporting a visual marker.

An augmented reality headset 10 worn by a user 12 moving through an environment 14 is illustrated in FIG. 1.

For the remainder of the description, by way of example, a longitudinal direction X is defined, represented in the figures by an X-axis, which is perpendicular to the direction of gaze of the user 12 of the headset 10 (or gaze axis of the headset 10) and in a horizontal plane in relation to the direction of gaze. A transverse direction Y is also defined, represented in the figures by a Y-axis, perpendicular to the longitudinal direction X and corresponding to the viewing direction of the user 12 of the headset 10. A direction of elevation Z is also defined, represented in the figures by a Z-axis, perpendicular to the longitudinal direction X and the transverse direction Y (and in a plane vertical to the direction of view).

The environment 14 is, for example, an indoor environment, such as the interior of a fixed or mobile facility. The environment 14 comprises at least one surface, the so-called support surface 16, which supports at least one visual marker 18.

The support surface 16 is advantageously flat and extends at least vertically. The support surface 16 is, for example, a surface of a wall or architectural support, such as a pillar or beam.

The visual marker 18 is an element, such as a code, possibly encoding data. The data is suitable for reading by a reader. The data can, for example, identify the visual marker and/or locate it.

The visual marker 18 comprises a rotation indicator. The rotation indicator is associated with a reference position on the visual marker 18. The indicator is used to determine the rotation ay of the visual marker 18 in the transverse direction Y relative to a reference position of the visual marker 18 (e.g. stored in a memory of the computer 24). The rotation is, therefore, about the Y-axis, remaining in the (XZ) plane perpendicular to the Y-axis.

In one example, the rotation indicator is part of the data encoded in the visual marker 18. In another example, the rotation indicator is a visual element represented on the visual marker 18.

The visual marker 18 is placed on the support surface 16 and follows the (flat) shape of the support surface 16. The visual marker 18 is, for example, attached to the support surface 16 via an attachment means, such as an adhesive.

The visual marker 18 is preferably a two-dimensional code, such as a QR (Quick Response) code, an EAN 13 code, a datamatrix code, or a Bleam code.

Figure 2:
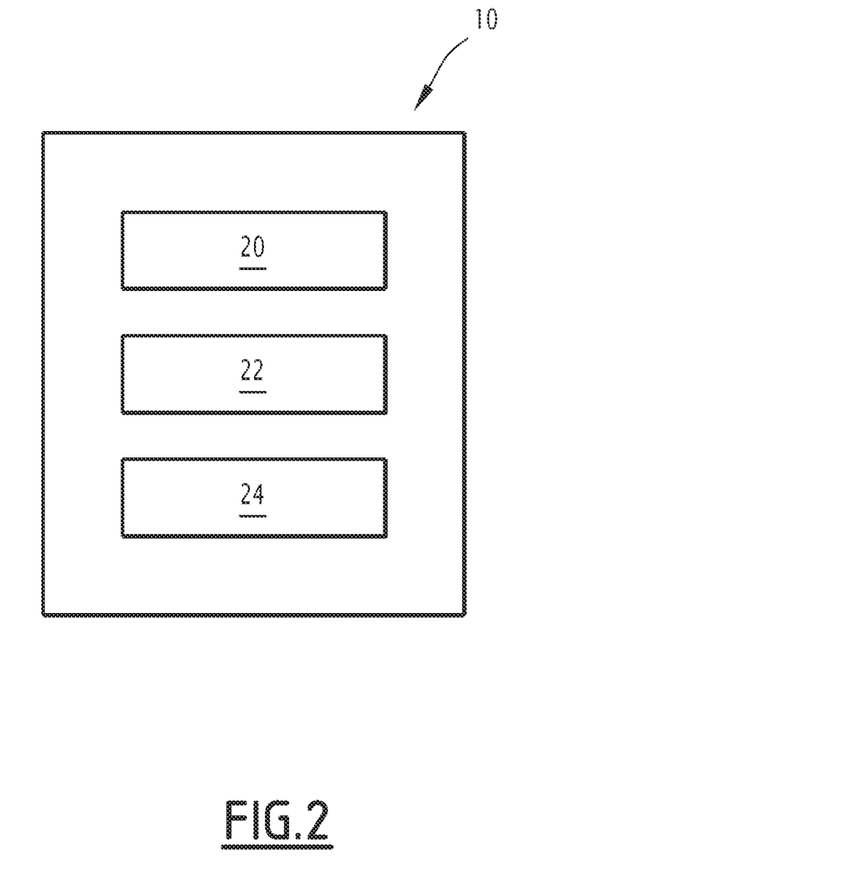
FIG. 2 is a schematic representation of an elements of the augmented reality headset of FIG. 1.

As illustrated in FIG. 2, the augmented reality headset 10 comprises a camera 20, a display 22 and a computer 24, all embedded in the headset 10.

The camera 20 is arranged on the headset 10 so as to acquire images of the user's field of view 12. The field of view is defined as the portion of space seen by a motionless eye looking straight ahead.

The display 22 is intended to be placed in the field of vision of the user 12 of the headset 10.

The display 22 is adapted to display one or more augmented reality elements E according to a command received by the computer 24. The augmented reality elements E displayed on the display 22 are thus superimposed on the environment 14 in the field of vision of the user of the headset 10.

The computer 24 comprises a processor with a data processing unit, memories, and a media reader.

In one example embodiment, the computer 24 interacts with a computer program product. The computer program product comprises an information medium. The information medium is a medium readable by the computer 24, usually by the data processing unit. The readable information medium is a medium adapted to store electronic instructions and capable of being coupled to a bus of a computer system. For example, the information medium is a memory, a magnetic or optical card, or a USB stick.

A computer program containing program instructions is stored on the information medium. The computer program is loadable on the data processing unit and is adapted to drive the implementation of a method for determining display features, which will be described in greater detail in the remainder of the description.

In one embodiment, the computer 24 is separate from the headset 10.

Advantageously, data relating to the position and orientation of at least one augmented reality element to be displayed E with respect to the visual marker 18 is stored in a memory of the computer 24. In other words, for a given position (x, y, z) and orientation (ax, ay, az) of the visual marker 18, there is associated a position (xobj, yobj, zobj) and orientation (axobj, ayobj, azobj) of the augmented reality element E. More generally, the position and orientation data is, for example, a three-dimensional model in which the augmented reality element E is perfectly defined with respect to the visual marker 18 according to six coordinates, namely three position coordinates (xobj, yobj, zobj) and three orientation coordinates (axobj, ayobj, azobj). The visual marker 18 thus makes it possible to link reality and the data model because it is the only element that is present both in reality and in the data model.

Figure 3:
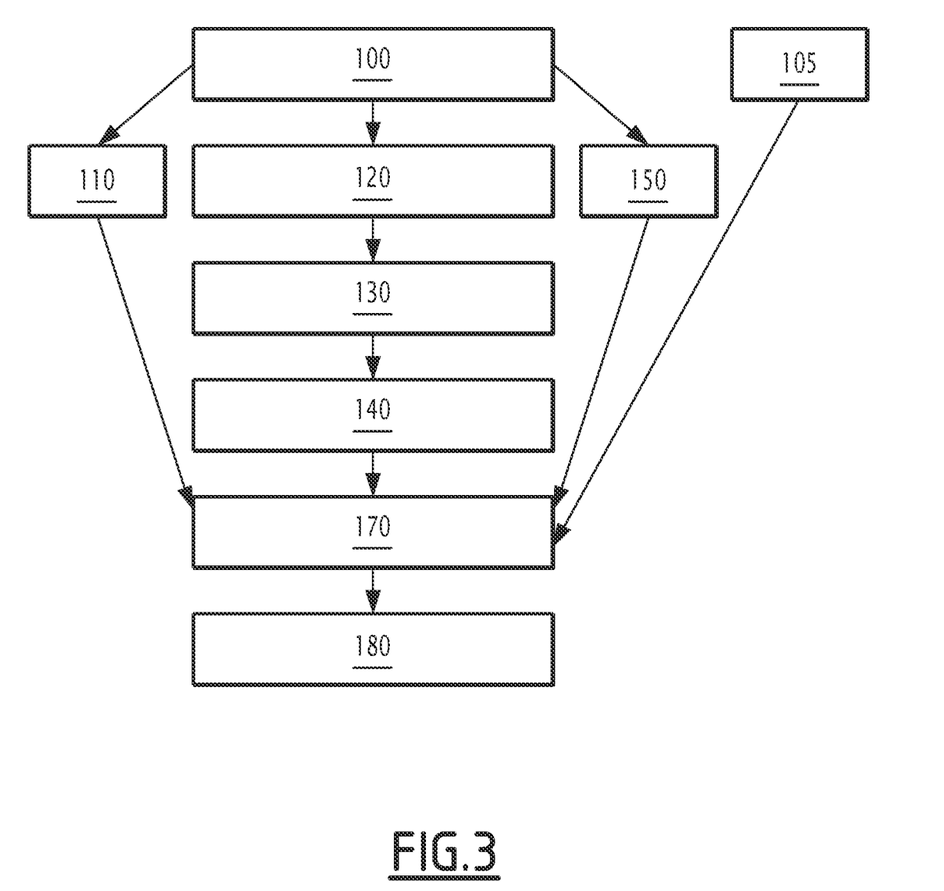
FIG. 3 is a flowchart of an example of a method for determining display features.

A method for determining display features will now be described with reference to the flowchart in FIG. 3 and the examples in FIGS. 4 to 6. The following steps of the method are, for example, implemented by the computer 24 as it interacts with the computer program product, i.e. implemented by computer.

The determination method comprises a step 100 of receiving, by the computer 24, an image IM of the environment 14 on which is imaged a visual marker 18 as previously described and the support surface 16 of the visual marker 18. Eventually, reading the data encoded in the visual marker 18 allows the location of the visual marker 18 to be obtained and/or identified.

The image IM was acquired by the camera 20 of the headset 10 worn by the user 12. The IM image is therefore an image of the user's field of view 12.

The determination method comprises a step 105 of obtaining data, referred to as correspondence data, relating to the position and orientation of an augmented reality element E to be displayed with respect to the visual marker 18. This provides the relative position (xobj, yobj, zobj) and relative orientation (axobj, ayobj, azobj) of an augmented reality element E with respect to the position (x, y, z) and orientation (ax, ay, az) of the visual marker 18.

The data is, for example, obtained via a three-dimensional model stored in a memory of the computer 24, as described above.

The determination method comprises a step 110 of calculating the distance D between the visual marker 18 and the user 12 by analysing the received image IM.

In one example implementation, the calculation step 110 comprises detecting reference points on the visual marker 18 imaged on the image IM. The reference points depend on the visual marker 18 being considered. For example, in the case of a square-shaped visual marker 18, such as a QR code, the reference points are the vertices of the square. In the case of a circular visual marker 18, the reference points are points defining the diameter of the circle.

The calculation step 110 then comprises determining the distance D based on the detected reference points and reference dimensions of the visual marker 18. The reference dimensions of the visual marker 18 are, for example, contained in a memory of the computer 24. Thus, in this example, the distance D is obtained on the principle of homothety.

The determination method comprises a step 120 of calculating a viewing angle α at which the user 12 sees the visual marker 18 by analysis of the received image IM.

In one example implementation, the calculation step 120 comprises detecting reference points of the visual marker 18 on the image IM. The reference points are, for example, the points described in calculation step 110.

The calculation step 120 comprises determining the deformation of the visual marker 18 in the image IM relative to a reference shape of the visual marker 18 as a function of the detected reference points. The determined deformation defines a rotation ax of the visual marker 18 with respect to the longitudinal direction X and a rotation az of the visual marker 18 with respect to the elevation direction Z. In other words, the deformation defines a rotation of the plane to which the marker 18 belongs about the X- and Z-axes, since the X- and Z-axes define the plane perpendicular to the Y-axis (which itself defines the user's viewing angle on the visual marker 18).

The viewing angle α is calculated according to the determined deformation. The viewing angle α is obtained on the principle of homothety.

The determination method comprises a step 130 of determining features relating to a plane containing the support surface 16, the plane being referred to as the support plane $P_s$.

The features determined are in particular the incline of the support plane $P_s$ with respect to the plane (XZ) defined by the longitudinal direction X and the elevation direction Z. In other words, the determined features make it possible to define the rotation Ax of the support plane $P_s$ with respect to the longitudinal direction X and the rotation Az of the support plane $P_s$ with respect to the elevation direction Z.

In an example implementation, the determination step 130 comprises different sub-steps set out in the following.

In this example, the calculation step 130 comprises a sub-step of determining features relating to a plane, known as the marker plane $P_M$, containing the visual marker 18 as a function of the calculated viewing angle α.

The determined features are in particular the incline of the marker plane $P_M$ with respect to the plane (XZ) defined by the longitudinal direction X and the elevation direction Z. In other words, the determined features are the rotation ax of the marker plane $P_M$ with respect to the longitudinal direction X and the rotation az of the marker plane $P_M$ with respect to the elevation direction Z.

The calculation step 130 comprises a sub-step of determining, by a detection model, features of a plane representing the support plane $P_s$, called a test plane $P_T$.

The detection model is a model for mapping or spatially meshing the surfaces of the environment 14 in the field of view of the camera 20 that acquired the received image IM.

The detection model uses, for example, a technology that identifies a surface by means of triangles whose vertices are known in space. A calculation is used to define the surface plane (and therefore its features) by averaging the positions of the triangles' vertices. The calculations are, for example, carried out by an algorithm, such as the VSLAM (Visual Simultaneous Localization and Mapping) algorithm.

The calculation step 130 comprises a sub-step of determining a deviation Δ (if any) between the marker plane $P_M$ and the test plane $P_T$.

The calculation step 130 comprises a sub-step of validating the test plane $P_T$ as the support plane $P_s$ only when the determined deviation Δ is less than or equal to a predetermined threshold.

If not, this means that the test plane $P_T$ is probably wrong and that the identified support surface 16 is not that of the visual marker 18. In this case, the sub-steps of determining a test plane $P_T$ and determining a deviation Δ are repeated until a validated test plane $P_T$ is obtained.

Such a validation sub-step is of particular interest depending on the position of the marker 18 in the environment 14. For example, when the marker 18 is placed on a pole, it is common to image two sides of the pole at the same time, namely the side where the marker 18 is placed and one of the adjacent sides. The validation sub-step then ensures that the correct side is detected as the support plane $P_s$.

The determination method comprises a step 140 of correcting the calculated viewing angle α according to the determined features of the support plane $P_s$ to obtain a corrected viewing angle $α_c$.

In an example implementation, the viewing angle correction α is determined as a function of the determined incline of the support plane $P_s$. In particular, the rotation ax of the visual marker 18 with respect to the longitudinal direction X is corrected by being replaced by the rotation Ax of the determined support plane $P_s$. Likewise, the rotation ax of the visual marker 18 with respect to the elevation direction Z is corrected by being replaced by the rotation Az of the determined support plane $P_s$. The corrected viewing angle $α_c$ is then deduced from the new coordinates: ax=Ax and az=Az.

The determination method comprises a step 150 of calculating the rotation ay of the visual marker 18 with respect to the transverse direction Y by analysing the rotation indicator of the visual marker 18. For example, the position of the rotation indicator of the visual marker 18 on the acquired image is, for example, compared with a reference position of the rotation indicator, from which the rotation ay can be derived. This is equivalent to correcting the incline of the operator's head.

The determination method comprises a step 170 of determining display features of the augmented reality element E as a function of the correspondence data, the calculated rotation ay, the calculated distance D, and the corrected viewing angle $α_c$.

Display features are features for displaying the augmented reality element E on the display 22 of the headset 10 so that the user 12 has the illusion that the elements E are in the user 12's environment 14. In particular, the correspondence data can be used to determine the position (xobj, yobj, zobj) and orientation (axobj, ayobj, azobj) of the element E relative to the visual marker 18. The distance D is used to determine the reduction or increase in scale to be applied to the element E to give the user 12 of the headset 10 the illusion that the element E is positioned at (xobj, yobj, zobj) and oriented (axobj, ayobj, azobj) relative to the visual marker 18 in the environment 14. The corrected viewing angle $α_c$ is used to determine the deformation to be applied to the element E to give the user 12 of the headset 10 the illusion that the element E is positioned at (xobj, yobj, zobj) and oriented (axobj, ayobj, azobj) relative to the visual marker 18 in the environment 14.

Figure 4:
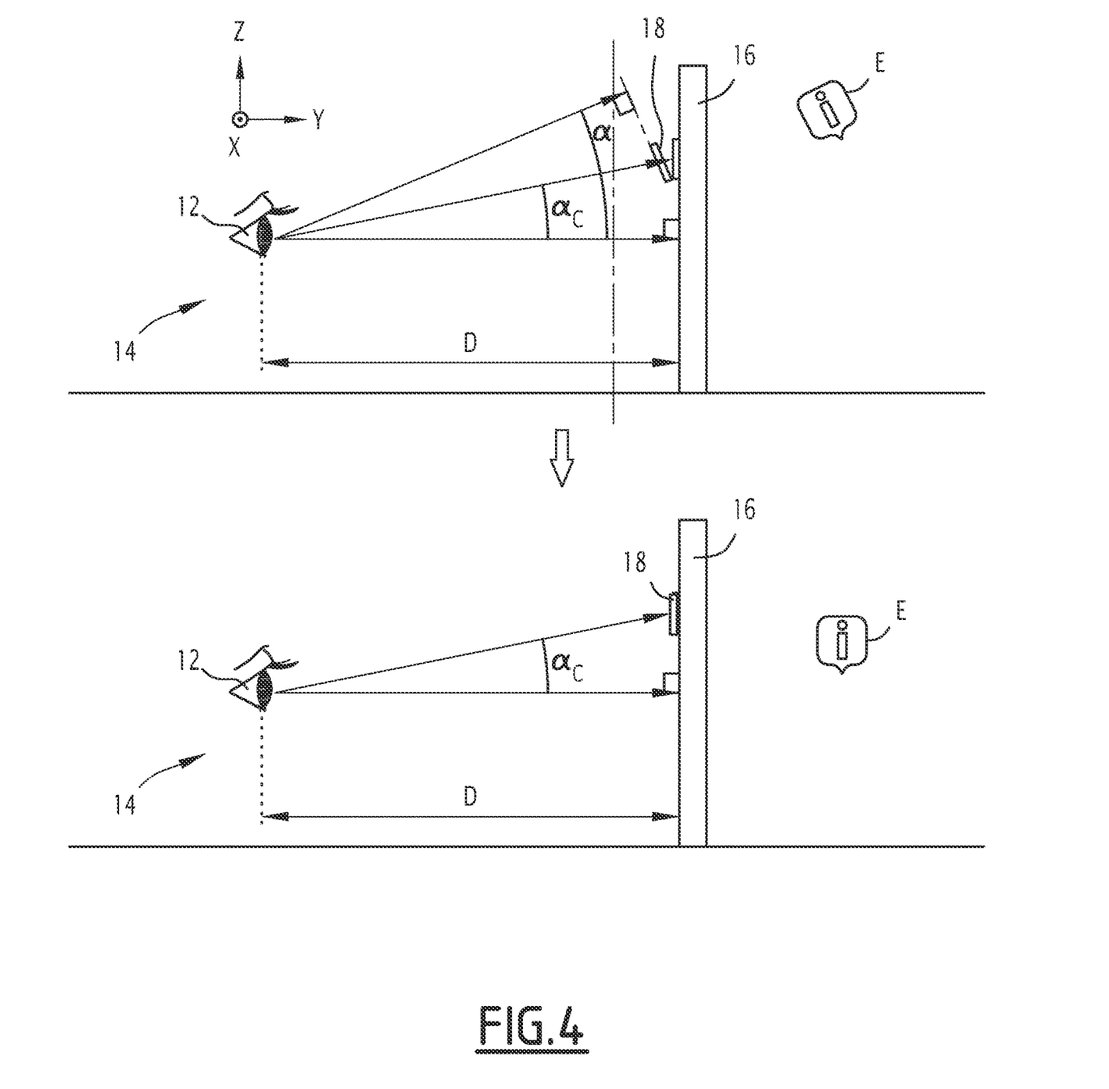
FIG. 4 is a schematic side view illustrating an example of a rendering in the environment of an augmented reality element displayed on a display of the headset of FIG. 1, the rendering being different depending on the calculated viewing angle from which the user sees the visual marker, the top figure thus illustrating the rendering obtained for an erroneous viewing angle and the bottom figure illustrating the rendering obtained for a corrected viewing angle.
Figure 5:
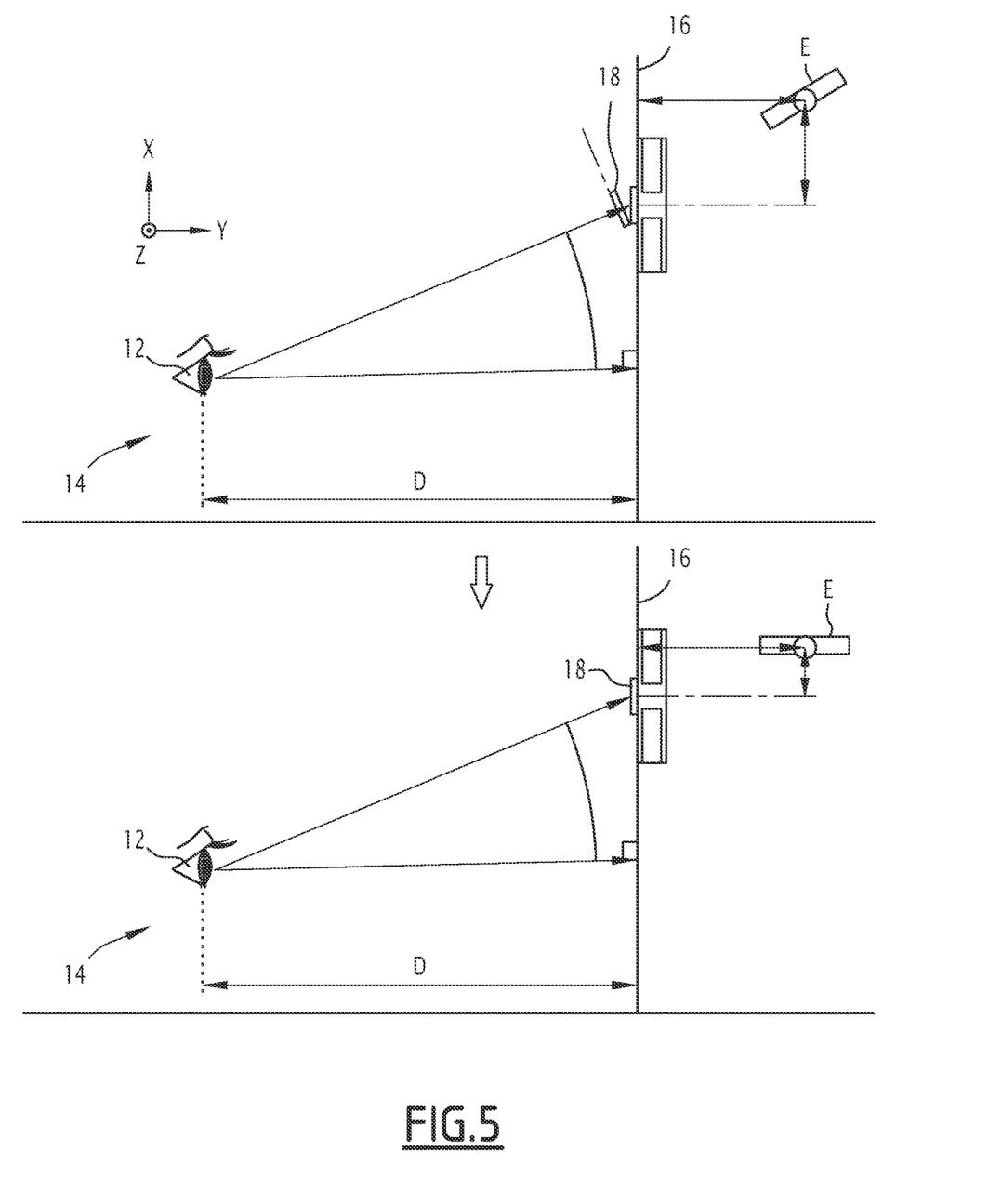
FIG. 5 is a schematic top view illustrating an example of a rendering in the environment of an augmented reality element displayed on a display of the headset of FIG. 1, the rendering being different depending on the calculated viewing angle from which the user sees the visual marker, the top figure thus illustrating the rendering obtained for an erroneous viewing angle and the bottom figure illustrating the rendering obtained for a corrected viewing angle.

As seen in FIGS. 4 and 5, the position and orientation of the augmented reality element E is dependent on the position and orientation of the visual marker 18. Thus, an erroneous viewing angle α for the visual marker 18 induces an erroneous positioning of the augmented reality element E as depicted in the upper part of FIGS. 4 and 5. When the viewing angle α is corrected, the positioning of the augmented reality element E is also corrected so that the element E fits into the environment 14, as shown in the lower part of FIGS. 4 and 5.

The determination method comprises a step 180 of sending a command to display, on the display 22 of the headset 10, the augmented reality element E associated with the visual marker 18 according to the determined display features. The augmented reality element E is then displayed on the display 22 of the headset 10.

Figure 6:
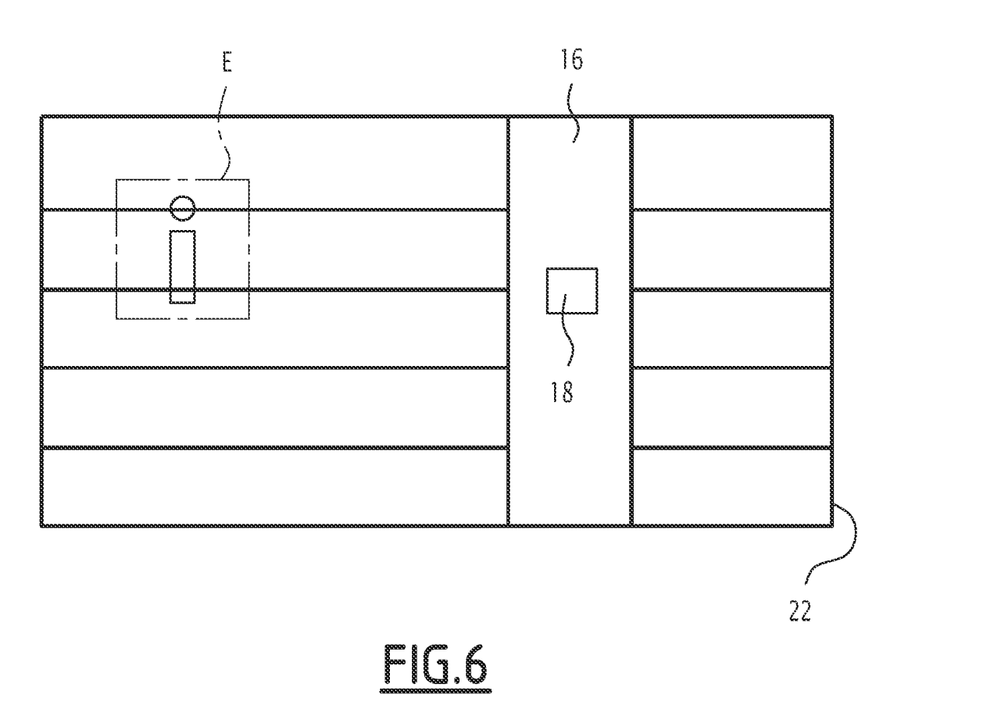
FIG. 6 is a schematic view of the field of view of the user of the headset of FIG. 1 when an augmented reality element is displayed on the headset's display (after correcting the viewing angle).

FIG. 6 shows an example of the augmented reality image seen by the user 12 of the headset 10.

Thus, the present method determines display features of an augmented reality element E to be displayed based on data obtained for a visual marker 18 present in the environment 14.

In particular, identifying the position of the visual marker 18 allows the determination of the augmented reality element(s) E to be displayed as a function of the position of the user 12 of the augmented reality headset 10. This is achieved by the obtained correspondence data and by determining the distance D between the user 12 and the visual marker 18 (e.g. measuring the relative shrinkage of the visual marker 18). This data alone would allow a point to be displayed where the visual marker 18 is located, but would not satisfactorily display non-point augmented reality elements E that are potentially distant from the visual marker 18. Indeed, an error of a few centimetres in the position (x, y, z) of the visual marker 18 would only be translated to the position of the element E to be displayed. Nevertheless, an orientation error on the orientation (ax, ay, az) of the visual marker 18 of a few degrees would become an error of several tens of centimetres in position relative to the position of the user 12, if the element E to be displayed is a few metres away from the visual marker 18 (not to mention that the element E to be displayed will also look crooked).

Therefore, the present method aims to accurately identify the orientation (ax, ay, az) of the visual marker 18 relative to a reference frame (X, Y, Z) defined with respect to the user 12 of the headset 10. The values of ax and az are obtained when calculating the viewing angle α (e.g. determining the deformation of the visual marker 18). However, because the visual marker 18 is small, it is difficult to have an accurate determination of ax and az. Therefore, the present method uses the determination obtained to approximate the plane of the visual marker 18 and determines the features (Ax, Az) of the support plane $P_s$ of the surface supporting the visual marker 18. As the features obtained for the support plane $P_s$ are more accurate (since the surface is larger than the visual marker 18), the data ax and az previously obtained for the visual marker 18 are replaced by the orientation (Ax, Az) of the support plane $P_s$.

Thus, the present method allows the augmented reality experience of the user 12 of the headset 10 to be improved regardless of the user's 12 position relative to a visual marker 18 serving as a reference for the display of virtual information, even if the virtual information is to be displayed at a distance from the reference.

The skilled person will understand that the order of the method's steps is given as an example and that the steps may be implemented in a different order. The skilled person will also appreciate that the above-described embodiments and variants can be combined to form new embodiments, provided that they are technically compatible.

The invention claimed is:

1. A method for determining display features of an augmented reality element, the method being implemented by a computer and comprising the steps of:
   a. receiving an image of an environment, the image depicting a visual marker and a surface, referred to as a support surface, serving as a support for the visual marker, the visual marker comprising a rotation indicator, the image having been acquired by a camera of an augmented reality headset worn by a user,
   b. obtaining data, known as correspondence data, relating to the position and orientation of an augmented reality element to be displayed with respect to the visual marker, c. calculating the distance between the visual marker and the user by analysing the received image,
d. calculating a viewing angle from which the user sees the visual marker by analysing the received image,
e. determining, as a function of the viewing angle, features relating to a plane containing the support surface, the plane being called the support plane, comprising the sub-steps of:
  i. determining features relating to a plane, called the marker plane, containing the visual marker as a function of the calculated viewing angle,
  ii. determining, by a detection model, features of a plane representing the support plane, known as the test plane,
  iii. determining a deviation between the marker plane and the test plane, and
  iv. validating the test plane as being the support plane only when the determined deviation is less than or equal to a predetermined threshold, and repeating the sub-steps of determining a test plane and determining a deviation until a validated test plane is obtained,
f. correcting the viewing angle calculated according to the determined features of the support plane to obtain a corrected viewing angle,
g. calculating the rotation of the visual marker with respect to a reference according to the rotation indicator of the visual marker, the rotation of the visual marker being calculated according to a direction corresponding to the direction of the user's gaze, called the transverse direction, and
h. determining display features of the augmented reality element based on the correspondence data, the calculated rotation, the calculated distance and the corrected viewing angle.

2. The method according to claim 1, wherein the visual marker has reference points, the step of calculating the viewing angle comprising detecting the reference points of the visual marker on the image, and determining the deformation of the visual marker on the image relative to a reference shape of the visual marker as a function of the detected reference points, the viewing angle being calculated as a function of the determined deformation.

3. The method according to claim 1, wherein the detection model is a model suitable for meshing the surfaces of the environment in the field of view of the camera having acquired the received image.

4. The method according to claim 1, wherein the step of determining features of the support plane comprises determining the incline of the support plane relative to a reference, and correcting the calculated viewing angle as a function of the determined incline.

5. The method according to claim 1, wherein the visual marker has reference points, the step of calculating the distance comprising detecting the reference points of the visual marker on the image, and determining the distance as a function of the detected reference points and reference dimensions of the visual marker.

6. The method according to claim 1, wherein the method comprises sending, to a display of the augmented reality headset worn by the user, a command to display the augmented reality element associated with the visual marker as a function of the determined display features.

7. The method according to claim 1, wherein the visual marker is a two-dimensional code.

8. A non-transitory computer-readable storage medium having stored thereon a computer program product comprising program instructions, for executing a determination method according to claim 1 when the computer program is run on a computer.

9. An augmented reality headset comprising a display, a camera capable of acquiring images of an environment in the field of view of a user of the headset and a computer, the computer being configured to implement a method according to claim 1.

* * * * *

UNITED STATES PATENT AND TRADEMARK OFFICE
CERTIFICATE OF CORRECTION

PATENT NO. : 11,978,164 B2
APPLICATION NO. : 17/677228
DATED : May 7, 2024
INVENTOR(S) : Arnaud Gonguet and Grégory Tetard Page 1 of 1

It is certified that error appears in the above-identified patent and that said Letters Patent is hereby corrected as shown below:

On the Title Page

Item (30) should read:
(30) Foreign Application Priority Data
February 22, 2021 (FR) ..................... 21 01690

Signed and Sealed this
Twenty-third Day of July, 2024

Katherine Kelly Vidal
*Director of the United States Patent and Trademark Office*